E. F. ANDREAE.
STORAGE BATTERY GRID.
APPLICATION FILED MAY 29, 1918.
1,371,661.
Patented Mar. 15, 1921.
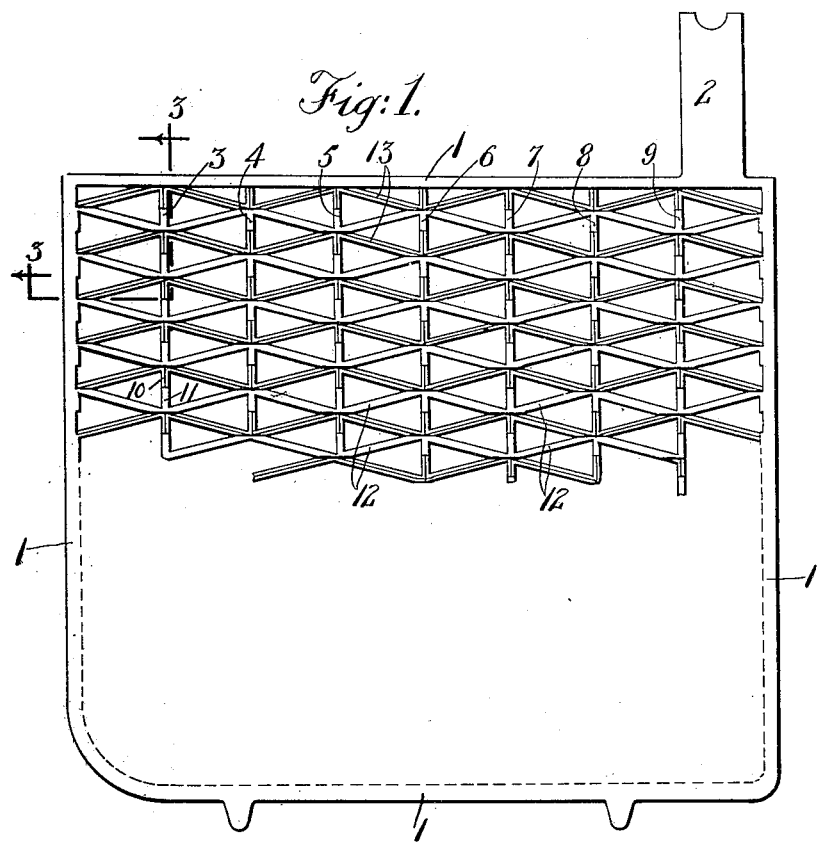
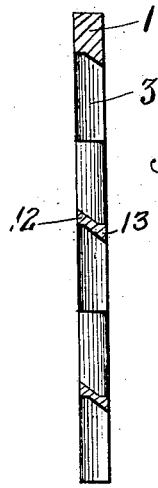
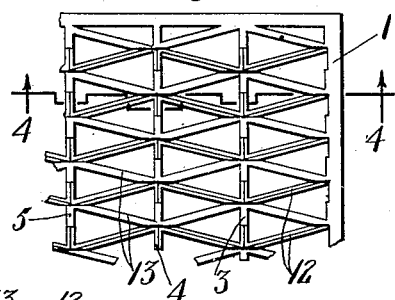
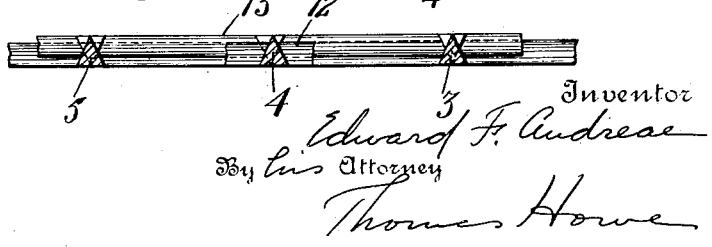
Inventor
Edward F. Andreae
By his Attorney
Thomas Howe

UNITED STATES PATENT OFFICE.

EDWARD F. ANDREAE, OF NEWARK, NEW JERSEY, ASSIGNOR TO GENERAL LEAD BATTERIES COMPANY, A CORPORATION OF DELAWARE.

STORAGE-BATTERY GRID.

1,371,661.  Specification of Letters Patent.  Patented Mar. 15, 1921.

Application filed May 29, 1918. Serial No. 237,199.

*To all whom it may concern:*

Be it known that I, EDWARD F. ANDREAE, a citizen of the United States, residing at Newark, in the county of Essex and State of New Jersey, have invented new and useful Improvements in Storage-Battery Grids, of which the following is a specification.

This invention relates to grids for holding the active material in a pasted type plate for storage batteries.

The main object of the invention is to provide a thin and light grid, in which the active material will be securely held and which readily lends itself to the operation of casting.

In double latticed grids having a space between the lattices, the active material becomes filled in between the lattices, thereby providing a large amount of active material in the plate. This also acts to securely hold the material. It has the disadvantage, however, that the plate is rather heavy and thick.

According to the present invention the plate may be made thin and light by moving the lattices so close together that the bars of the two lattices overlap each other.

The grid as is customary, comprises a frame with partitions or ribs extending parallel to each other from one side of the frame to the other, the lattice bars extending between adjacent ribs. According to the present invention, where the grid is made thinner by bringing the lattices into closer relation, the securing of the active material is assured by making the lattice bars triangular in cross section and having the base of the triangle at the outer surface, the apex of the triangle being at the innermost point of the lattice bar. This arrangement of having the broadest faces of triangular shaped bars outwardly with the thin edges inwardly, may also be of service in the double lattice plates wherein the lattices are separated by a space, as before referred to, this structure of the lattice bars tending to force the active material from the surface toward the interior of the plate and presents obstacles to the outward movement of the active material, because the inclination of the surfaces of the bars with which the active material engages is toward the center of the plate. Where the lattices are pushed together so closely that the lattices lie in substantially the same plane and the grid becomes a single lattice grid, the same idea is carried out by making lattice bars between adjacent partitions or ribs of triangular section with their broad faces alternately on opposite sides of the grid. As a means for aiding in securing the active material, the ribs or partitions may be made of triangular cross section, alternate sections having their broad faces facing in opposite directions.

Other and ancillary objects of the invention will appear hereinafter.

In the accompanying drawings, which illustrate the invention—

Figure 1 is a side elevation of a grid embodying the invention;

Fig. 2 is a side elevation of the upper left hand corner of the plate as shown in Fig. 1, but viewed from the opposite side of the plate as shown in that of Fig. 1;

Fig. 3 is a section on the line 3—3 of Fig. 1; and—

Fig. 4 is a section on the line 4—4 of Fig. 2.

Referring to the drawing, the grid comprises a marginal frame 1, from which may extend at the top a lug 2 for making electrical connections to the plate. Extending from the top marginal bar of the grid to the bottom are ribs or partitions 3, 4, 5, 6, 7, 8 and 9. These ribs are of triangular section and alternate lengths as 10 and 11 of the bars, have broad faces facing toward opposite sides of the grid. Between each two ribs, for instance, between the ribs 5 and 6 are two sets of lattice bars, one of the sets composed of the bars 12 and the other set composed of the bars 13. The two sets of bars which may be considered as respectively forming lattices, are displaced from each other transversely of the grid, but overlap each other when viewed edgewise of the grid. It will be observed that the two sets of bars are oppositely inclined and they are of triangular cross section, having their broad faces outermost and the apices innermost of the plate, this having advantages as has been set forth above.

Proceeding longitudinally of the ribs, it will be seen that the bars 12 and 13 alternate so that the bars of the lattice between two ribs or a rib and a marginal frame alternately have broad surfaces facing toward different sides of the grid and are staggered.

While the invention has been illustrated in what is considered its best embodiment, it may have other embodiments without departing from its spirit and is not, therefore, limited to the structure shown in the drawings.

What I claim is—

1. A metal storage battery grid having a marginal frame, ribs or partitions extending between opposite sides of the frame and lattice bars extending between said ribs, one set of said lattice bars lying in one plane and the other set of lattice bars lying in another plane, the said planes being displaced transversely of the grid, and bars of one lattice overlapping the bars of the other lattice, viewed edgewise of the grid.

2. A metal storage battery grid having a marginal frame, ribs or partitions extending between opposite sides of the frame and lattice bars extending between said ribs, one set of said lattice bars lying in one plane and the other set of lattice bars lying in another plane, the said planes being displaced transversely of the grid, bars of one lattice overlapping the bars of the other lattice, viewed edgewise of the grid, said lattice bars being triangular in cross section and having broad faces outermost, their apices innermost.

3. A metal storage battery grid having a marginal frame, ribs or partitions extending between opposite sides of the frame and lattice bars extending between said ribs, the said lattice bars being triangular in cross section and inclined to said ribs and the lattice bars between two adjacent ribs having broad faces of alternate lattice bars, proceeding longitudinally of the ribs, presented at opposite sides of the grid and being the outside portions of the lattice bars.

4. A metal storage battery grid having a marginal frame, ribs or partitions extending between opposite sides of the frame and lattice bars extending between said ribs, the lattice bars between two adjacent ribs being staggered, inclined to said ribs and of triangular cross section, the alternate bars, proceeding lengthwise of the ribs, having their broad surfaces presented at opposite sides of the grid.

5. A metal storage battery grid having a marginal frame, ribs or partitions extending between opposite sides of the frame and lattice bars extending between said ribs, the lattice bars between two adjacent ribs being staggered and of triangular cross section, the alternate bars, proceeding lengthwise of the ribs being oppositely inclined and having their broad surfaces presented at opposite sides of the grid.

6. A metal storage battery grid having a marginal frame, ribs or partitions extending between opposite sides of the frame and lattice bars extending between said ribs, the lattice bars between two adjacent ribs being staggered and of triangular cross section, the alternate bars, proceeding lengthwise of the ribs, having their broad surfaces presented at opposite sides of the grid and the said bars overlapping each other, viewed edgewise of the grid.

7. A metal storage battery grid having a marginal frame, ribs or partitions extending between opposite sides of the frame, each of said ribs or partitions being triangular in cross section and having alternate lengths proceeding longitudinally of the rib, having broad faces facing toward opposite sides of the grid, and lattice bars extending between said ribs, said lattice bars being triangular in cross section, and the lattice bars between two adjacent ribs having broad faces of alternate lattice bars, proceeding longitudinally of the ribs, presented at opposite sides of the grid and being the outside portions of the lattice bars.

8. A metal storage battery grid having a marginal frame, ribs or partitions extending between opposite sides of the frame and lattice bars extending between said ribs, the said lattice bars being triangular in cross section and inclined to said ribs and of less depth than the thickness of the grid, the lattice bars between two adjacent ribs having broad faces of alternate lattice bars, proceeding longitudinally of the ribs, presented at opposite sides of the grid and being the outside portions of the lattice bars.

9. A metal storage battery grid having a marginal frame, ribs or partitions extending between opposite sides of the frame and lattice bars extending between said ribs, the said lattice bars being triangular in cross section, and the lattice bars between two adjacent ribs presenting broad faces, some to one face of the grid and some to the other face of the grid, those lattice bars presenting broad faces to the same face of the grid being sustantially parallel to each other and inclined to said ribs.

10. A metal storage battery grid having a marginal frame, ribs or partitions extending between opposite sides of the frame and lattice bars extending between said ribs, the said lattice bars being triangular in cross section, and the lattice bars between two adjacent ribs presenting broad faces, some to one face of the grid and some to the other face of the grid, those lattice bars presenting broad faces to the same face of the grid being substantially parallel to each other and inclined to said ribs, and those bars presenting broad faces to the other side of said grid being substantially parallel to each other and inclined to said ribs in the opposite direction.

11. A metal storage battery grid having a marginal frame, ribs or partitions extending between opposite sides of said frame, each of said ribs or partitions being triangular in cross section and having alternate lengths, proceeding longitudinally of the rib, having broad faces facing toward opposite sides of the grid, and lattice bars extending between said ribs, said lattice bars being triangular in cross section, and the lattice bars between two adjacent ribs having broad faces of alternate lattice bars, proceeding longitudinally of the ribs, presented at opposite sides of the grid and being the outside portions of the lattice bars, those lattice bars presenting broad faces to one side of the grid being inclined to said ribs and substantially parallel to each other, and the ribs presenting broad faces to the opposite sides of the grid being reversely inclined with relation to each other.

In testimony whereof I have signed this specification this 16th day of May, 1918.

EDW. F. ANDREAE.